Aug. 31, 1926. Re. 16,414
L. M. RIDDLE
WALL ILLUMINATING STRUCTURE
Original Filed March 7, 1924 2 Sheets-Sheet 1
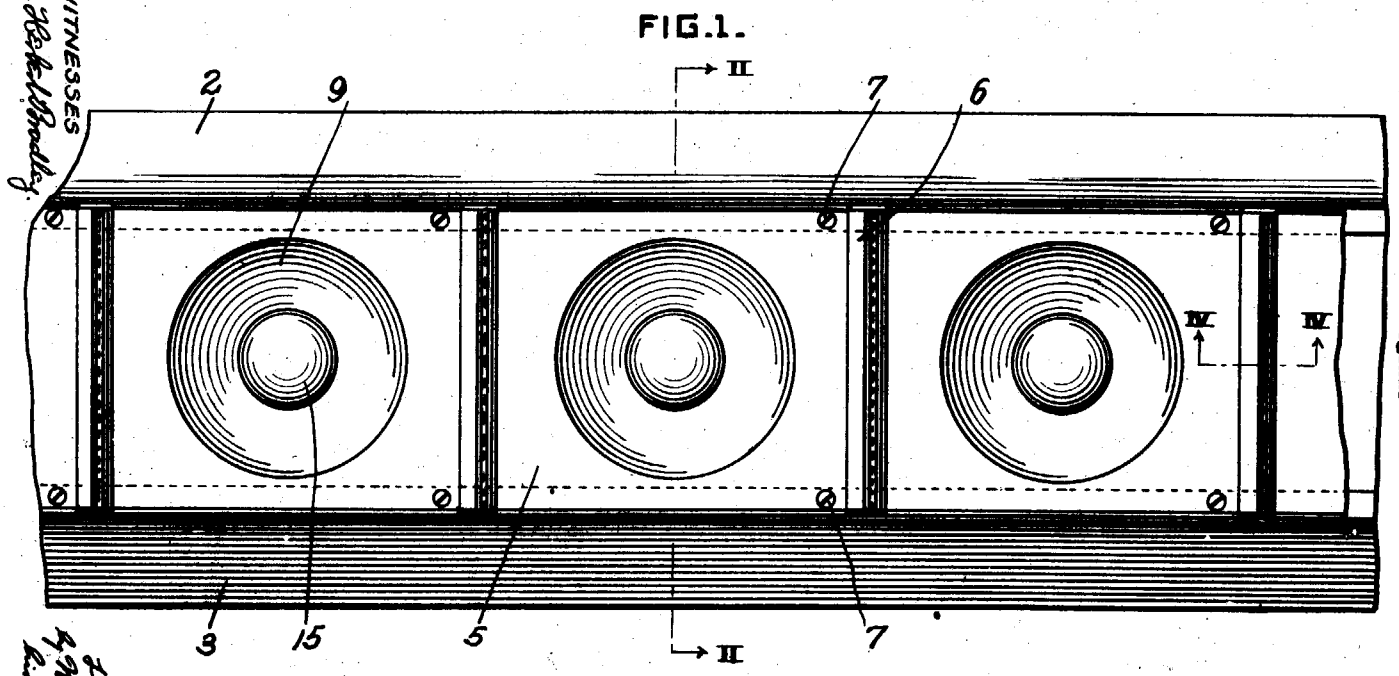
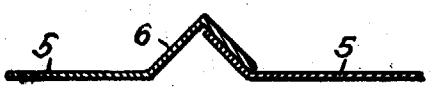
WITNESSES
J. Herbert Bradley.
INVENTOR
Louis M. Riddle,
by Winter Brown & Critchlow
his attorneys.

Aug. 31, 1926.
Re. 16,414
L. M. RIDDLE
WALL ILLUMINATING STRUCTURE
Original Filed March 7, 1924 2 Sheets-Sheet 2
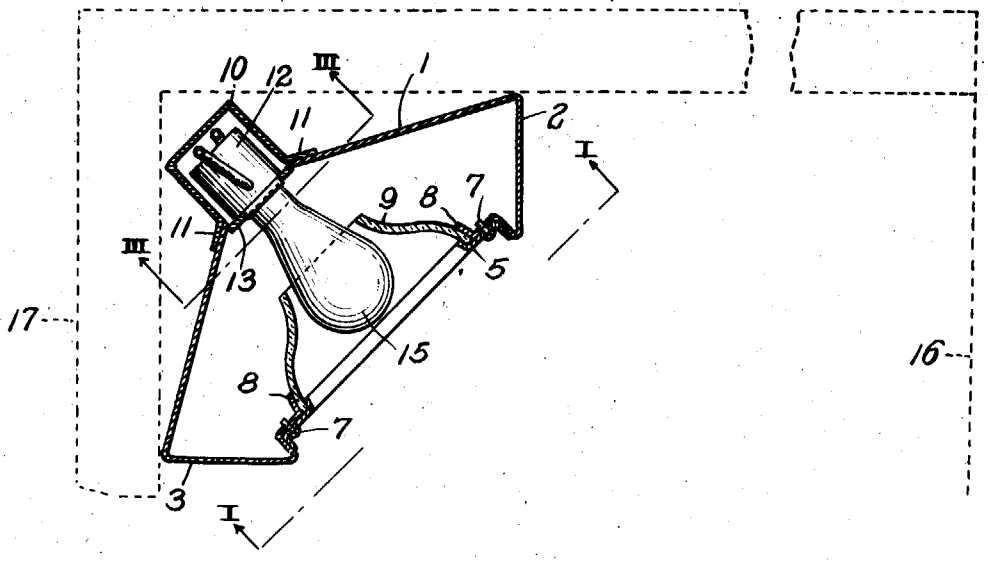
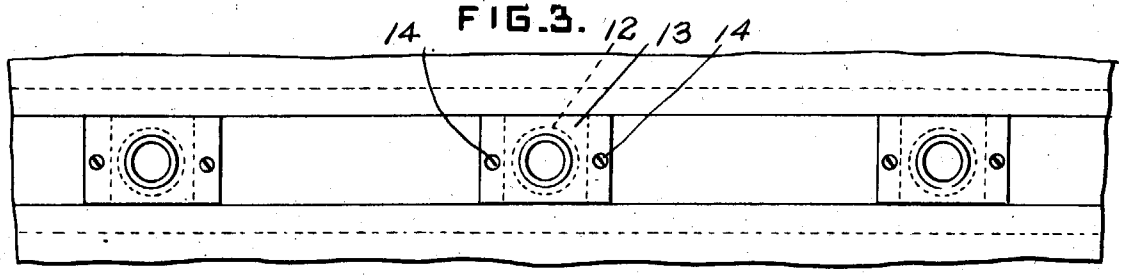
WITNESSES
J. Helen Bradley.
INVENTOR
Louis M. Riddle
by Winter Brown & Critchlow,
his attorneys.

Reissued Aug. 31, 1926.

Re. 16,414

UNITED STATES PATENT OFFICE.

LOUIS M. RIDDLE, OF PITTSBURGH, PENNSYLVANIA, ASSIGNOR TO OCHILTREE ELECTRIC COMPANY, OF PITTSBURGH, PENNSYLVANIA, A CORPORATION OF PENNSYLVANIA.

WALL-ILLUMINATING STRUCTURE.

Original No. 1,513,933, dated November 4, 1924, Serial No. 697,491, filed March 7, 1924. Application for reissue filed March 24, 1925. Serial No. 18,065.

The invention relates to structures for illuminating walls generally, whether they be exterior or interior walls, or sign boards, etc., but particularly for illuminating exterior walls of buildings which are provided with overhanging cornices.

The object is to provide a wall-illuminating structure for supporting electric lamp sockets and reflectors, constructed and arranged to facilitate installation and repair, and to prevent injury to persons by reason of breakage of glass reflectors.

The invention is illustrated in the accompanying drawings of which Fig. 1 is a face view of the structure, the plane of view being indicated by the line I—I, Fig. 2; Fig. 2 a transverse sectional view taken on the line II—II, Fig. 1, the structure being shown in the preferred position which it occupies for illuminating an exterior wall of the building; Fig. 3 a sectional view taken on the line III—III, Fig. 2; and Fig. 4 a detailed sectional view taken on the line IV—IV, Fig. 1.

The illuminating structure provided according to this invention comprises a trough, preferably formed of sheet metal, having its open side lying in a plane inclined, preferably downwardly, from the vertical and closed by a removable plate which is preferably formed of a plurality of separate segments each independently removable from the trough. To the back of the trough there is attached an electric conductor conduit, in which, or adjacent to which, there are a plurality of lamp sockets mounted on brackets removably attached to the trough. On the removable front plate of the trough there are mounted reflectors which project inwardly from the plate so that in case a reflector is broken the pieces of it will fall into the lower portion of the trough rather than out of it.

Having reference to the illustrative embodiment of the invention, the trough includes a back 1 and sides 2 and 3 which are preferably arranged with the back to form a reentrant trough chamber. The outer edges of the sides may be bent first towards back 1 and then towards the center of the trough to form shelves 4 to receive the edges of a front plate 5. This plate is preferably formed of a plurality of segments having overlapping ends, one end being turned outwardly and the other being provided with a stiffening corrugation 6, as shown in Fig. 4. Each of these plates may be attached to shelves 4 by means of a pair of screws 7. Each segment of the plate forming the removable front of the trough is provided with an opening adjacent to which there are suitable clips which may take the form of bendable lugs 8 for holding a reflector 9, the outer edge of which bears upon the plate adjacent to its opening.

On the back 1 of the trough there is an electric conductor conduit 10 which may take the form shown in Fig. 2. It, too, may be formed of sheet metal having edges 11 bent outwardly and soldered, or otherwise secured to back 1 of the trough. Lamp sockets 12 are preferably arranged in conduit 10 and mounted on suitable brackets 13 removably attached to the back of the trough by means of screws 14. The lamp sockets are arranged to register with openings in the back of reflectors 9 so that incandescent electric lamps 15 may be placed in the sockets from the outside of the structure.

While the structure may be variously shaped for illuminating different walls, it is preferably shaped as shown in the drawings for illuminating an exterior wall of a building. When so shaped it may be arranged in an overhanging cornice 17 of a building with the open side of the trough inclined downwardly from the vertical in a position to illuminate an exterior wall 16, the cornice and wall being indicated in dotted lines in Fig. 2.

In case a reflector 9 is broken, it being understood that these reflectors are usually formed of mirrored glass, the broken pieces of the reflector will fall in the lower portion of the reentrant trough chamber rather than on a pavement below where injury to pedestrians might result. In case of trouble with a socket or reflector, access to each may be readily had without disturbing the entire structure. If a reflector breaks all that it is necessary to do is to remove segment 5 on which it is mounted and substitute a new reflector. In case of trouble with a socket, all that it is necessary to do is to remove the front segment 5 and the bracket 13 to which the socket is attached.

It is a further characteristic of the invention that the reflectors are supported in such a manner that they are readily accessible for cleaning.

According to the provisions of the patent statute, I have described the principle and operation of my invention, together with the structure which I consider to represent the best embodiment of it. However, I desire to have it understood that, within the scope of the appended claims, the invention may be practiced by other forms of construction than that particularly illustrated and described.

I claim as my invention:

1. A wall-illuminating structure comprising a trough having its open side lying in a plane inclined from the vertical and closed by a removable plate, an electric conductor conduit attached to the back of the trough, lamp sockets supported by the back of the trough and extending into said conductor conduit, and reflectors supported by said front plate and projecting into the trough.

2. A wall-illuminating structure comprising a trough having its open side lying in a plane inclined downwardly from the vertical and closed by a removable plate, an electric conductor conduit attached to the back of the trough, and brackets removably attached to the back of the trough adjacent to said conduit, lamp sockets attached to said brackets, and reflectors supported by said front plate.

3. A wall-illuminating structure comprising a trough having its open side lying normally in a plane inclined downwardly from the vertical, a plurality of removable plates closing said opening of said trough and provided with openings, lamp sockets supported at the back of said trough in registration with said openings in said trough-closing plates, and fragile reflectors in said trough each having its outer edge adjacent to one of said openings in said plate.

4. A wall-illuminating structure comprising in combination a trough, an electrical conductor conduit attached thereto, a plurality of lamp sockets supported by and secured to the back of the trough and extending into said conduit, reflectors mounted in alignment with said sockets, and a plurality of cover plates secured to the front of said trough and having openings in registration with the said sockets and reflectors, said cover plates having interacting parts to maintain them in proper alignment with the lamp sockets, reflectors and with each other.

In testimony whereof I sign my name.

LOUIS M. RIDDLE.